Oct. 5, 1954        W. B. WALTERS        2,690,759
AUTOMATIC FUEL GAS CONTROL VALVE AND REGULATOR
Filed Oct. 25, 1951
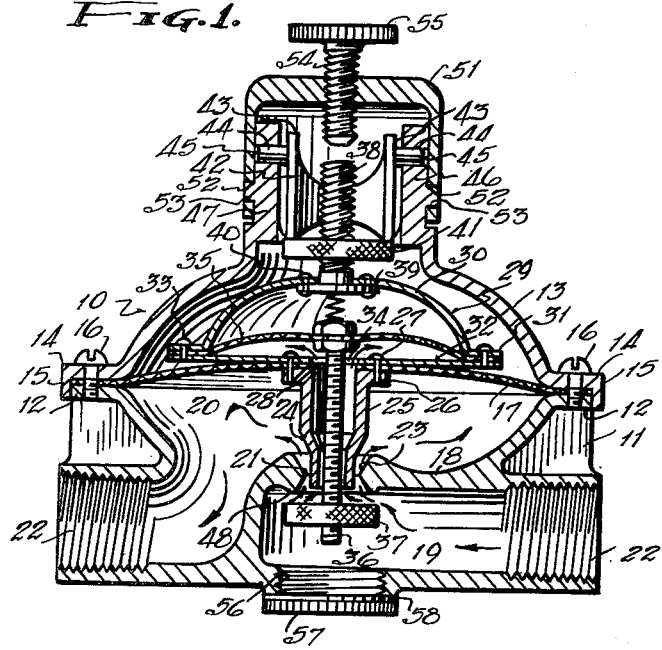
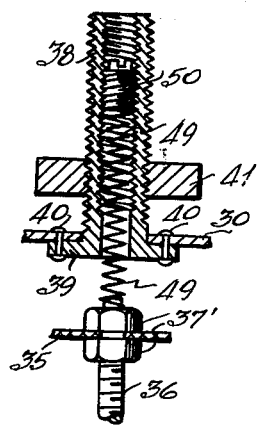
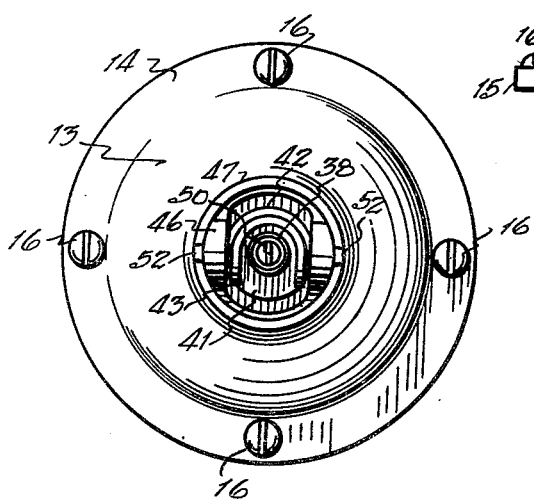
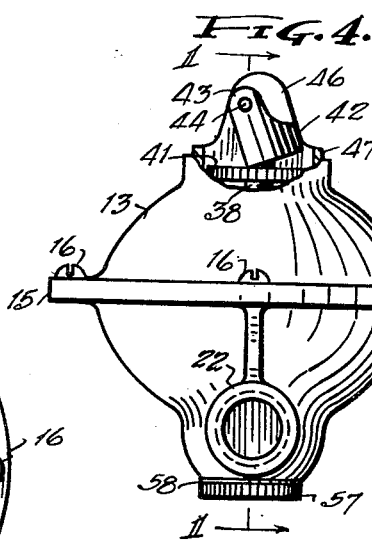
WALTER B. WALTERS
INVENTOR.
BY
ATTORNEY Patented Oct. 5, 1954

2,690,759

UNITED STATES PATENT OFFICE 2,690,759

AUTOMATIC FUEL GAS CONTROL VALVE AND REGULATOR

Walter B. Walters, San Antonio, Tex.

Application October 25, 1951, Serial No. 253,137

6 Claims. (Cl. 137—494)

This invention relates to gas cutoff and regulator valves of the type employed in gas service lines for domestic uses, and it has particular reference to a combination cutoff valve and regulator by which natural or artificial fuel gases can be cut off from appliances, when pressures drop below a safe value, and the principal object of the invention resides in the provision of a unit which is compact and simple in design but dependably capable of controlling the flow of fuel gases through a service line to insure safety when the pressures are depleted through uncommon demands, line breakages, or any other cause.

An object of the invention is that of providing a device by which the gas pressures entering the house lines to the appliances can be properly regulated so that adequate pressures can be made constantly available while preventing excess pressures which may impair the operation of the appliance to a dangerous extent.

Another object of the invention is that of providing a valve and regulator structure which embodies means for locking the valve closed when the supply line pressures have diminished below a safe value, and by which the flow of gas through the line to the appliance cannot be resumed until the valve is manually unlocked.

Broadly, the invention contemplates the provision of a simple and economical control mechanism for fuel gas which can be readily and easily installed in the service line at or near any appliance connected thereto and adjusted to the particular conditions under which it is most desirable to operate the device, or in accordance with the prescribed pressure limits of the appliance to insure safety. The invention is related, in its scope, to the cutoff and control valves described in Letters Patent Nos. 1,963,452, dated June 19, 1934, and 2,266,943, dated December 23, 1941, and issued to Walter B. Walters.

While the foregoing objects are paramount, other and lesser objects will become manifest as the description proceeds, taken in connection with the appended drawings wherein:

Figure 1 is a vertical cross-sectional view of the invention, on lines 1—1 of Figure 4, showing the low pressure diaphragm and the secondary high pressure diaphragm, the locking device and the adjustable pressure control member.

Figure 2 is a longitudinal sectional view of the locking stem, and tensioning adjustment for the flow control stem.

Figure 3 is a plan view of the invention illustrating the locking device for the cutoff stem, and Figure 4 is a side elevational view of the invention showing a portion cut away to illustrate the locking device in its unlocked or inoperative position on its adjustable seat.

Accordingly, the invention comprises a housing 10 which consists of a lower body 11 which is formed with a peripheral flange 12 to which is attached an upper cap portion 13 whose flange 14 has a depending rim 15 which embraces the flange 12, as shown in Figure 1. The member 13 is secured by screws 16 and between the body 11 and the upper member 13 is secured a diaphragm 17 of a pliable material such as rubberized fabric.

The lower body portion 11 has a partition 18 which separates the inlet chamber 19 from an outlet chamber 20, and a port 21 provides a communication between the chambers 19 and 20. Each of the chambers 19 and 20 has threaded couplings 22 by which the housing 10 can be connected into a gas service line.

The port 21 has a bevelled seat 23 formed in its upper side which is engaged by the tapered surface 24 of a hollow stem 25 whose upper end has a flange 26 by which the stem 25 is secured by rivets 27 to the diaphragm 17 about a central opening 28 therein. Above the diaphragm 17, in the cap portion 13, is a casing 29, semi-spherical in form, having a concavo-convex portion 30 which has a flange 31 and a circular plate 32 connected to the flange 31 by rivets or screws 33, the plate 32 having a central port or opening 34 about which the plate 32 is secured to the flange 26 of the hollow stem 25 by the rivets 27 above the diaphragm 17, as depicted in Figure 1.

The casing 29 has a smaller diaphragm 35 therein of a material similar to that of the diaphragm 17 and it is secured about its circular edge between the flange 31 of the member 30 and the plate 32 by the rivets 33. Secured centrally of the diaphragm 35 is a threaded stem 36 by nuts 37'. The stem 36 is arranged concentrically of the hollow stem 25, and of the openings 28 and 34, and projects below the lower end of the hollow stem 25 into the inlet chamber 19. A knurled closure member 37 is threaded upon the lower end of the stem 36 to provide an adjustable closure for the port 21 when the service line pressure is increased above a safe value. The function of this element will become more apparent as the description proceeds.

Secured to the upper member 30 of the casing 29 is a hollow floating stem 38 which is threaded interiorly and exteriorly, as shown in Figure 2. The hollow stem 38 has a flange 39 formed on its lower end and a rigid connection with the member 30 is made through rivets 40. A knurled disk 41, similar to the element 37 on the stem 36, is threaded on the stem 38 and is thus adjustable. The disk 41 provides a seating surface for a lock 42, which is semi-circular in plan, having ears 43 which have pins 44 thereon extending into apertures 45 in each of a pair of integral projections 46 forming parts of the neck portion 47 of the housing section or cap portion 13.

The lock 42 is thus pivotal and is capable of being positioned at an angle with respect to the valve disk 41, as shown in Figure 4, when the valve is open to the flow of gas therethrough. Obviously, when the hollow stem 25 is dropped to its lowermost position, so that its tapered surface engages the seat 23 in the port 21, the lock 42 will swing down to firmly seat itself upon the disk 41 to lock the stem 25 in closed position and it will require manual operation of the lock 42 to permit the stem 25 to be raised by gas pressure entering the inlet chamber 19. Depletion of pressure in the outlet chamber 20 will cause the stem 25 to be lowered by gravity when pressure on the diaphragm 17 is nullified.

Proper flow of the gas is constantly maintained by the secondary diaphragm 35 which is amenable to the pressure of gas flowing through the hollow stem 25, as indicated by arrows in Figure 1, to raise the threaded stem 36, and the closure element 37 thereon toward the annular seat 48 formed about the port 21 on its lower side. The flow is controlled through the port 21 by the proximity of the element 37 to the port 21 and by such arrangement it would not be possible to admit excessive pressures through the valve to the appliance. The element 37, being adjustable with respect to the port 21, the pressures can be accurately controlled at all times.

It is desirable to provide an adjustable tension upon the threaded stem 36 to more accurately control the operation thereof, and a coil spring 49 is arranged in the hollow stem 38 so that its lower end bears against the top of the threaded stem 36 while its upper end is engaged by a screw 50 threaded into the floating hollow stem 38, the tension of the spring 49 being adjustable by the screw 50. A relatively sensitive adjustment can obviously be accomplished by the means thus provided.

A cap 51 is attached to the neck 47 of the upper cap portion 13 of the housing 10, being secured by lugs 52, integral with the projections 46 on the neck 47, which extend into elongated apertures 53 in the cap 51, as shown in Figure 1. After proper adjustments are made on the disk 41 and the spring 49 the cap 51 can be installed, and a screw 54 is threaded through the cap 51 so that its lower end can be positioned with relation to the upper end of the floating stem 38 so as to limit the upward movement thereof. The screw 54 has a knurled head 55 thereon.

Access is gained to the knurled member 37 through an opening 56 in the bottom of the housing 10 and is closed by a plug 57 threaded thereinto. A suitable gasket 58 is provided to properly seal the housing 10.

Manifestly, the structure herein shown and described is capable of certain changes and modifications, by persons skilled in the art, without departing from the spirit and intent of the invention or the scope of the appended claims.

What is claimed is:

1. In a gas cutoff and regulator valve, in combination, a housing having inlet and outlet chambers and means providing communication therebetween, a diaphragm-actuated hollow stem for closing said communication, a chamber in the upper portion of said housing and a subchamber operatively disposed therein connected to the upper end of said hollow stem, a stem arranged concentrically of said hollow stem and extending into said subchamber, a diaphragm in said subchamber connected to said last named stem and amenable to pressures entering said subchamber through said hollow stem, means on said last named stem for restricting said communication and means in the top of said housing for locking said hollow stem in closed position in said communication until manually operated.

2. In an automatic gas cutoff and regulator valve having a housing and means for connecting the same into a gas line, in combination, an inlet and an outlet chamber formed in said housing and a communication between said chambers, a diaphragm in the outlet chamber and a hollow stem connected at its upper end to said diaphragm and having a seat on its opposite end providing a closure for said communication, a subcasing in said housing above said diaphragm and said hollow stem and a second diaphragm arranged in said subcasing, a second stem connected to said second diaphragm and operating concentrically of said hollow stem, means adjustably supported on said second stem for restricting said communication, and means for locking said hollow stem in said communication to close the same until manually actuated.

3. In a cutoff and regulator valve for gas having connection with a gas service line, in combination, a housing having inlet and outlet chambers formed therein and a communication therebetween, a hollow stem operatively arranged in said communication formed with means for closing the same when pressure is depleted in said outlet chamber, a diaphragm in said housing connected to said hollow stem amenable to the pressure in said outlet chamber, a threaded stem operatively arranged in said hollow stem and a diaphragm connected to said threaded stem amenable to gas pressure in said inlet chamber for controlling the same, and a locking device for securing said hollow stem in said communication to close the same.

4. In a gas cutoff and regulator valve, a housing having means for connecting inlet and outlet conduits thereto, a diaphragm arranged in said housing and having a hollow valve stem rigidly connected thereto for closing communication between said inlet and outlet conduits and amenable to gas pressure from said outlet conduit to retain said stem in raised position, a casing in said housing above said diaphragm and having a diaphragm therein, a stem connected to said last named diaphragm and operating concentrically of said hollow stem, adjustable means on said last named stem for controlling said communication between said inlet and outlet conduits, and means for locking said first named stem in closed position when pressure from said outlet conduit is minimized.

5. In a gas cutoff and regulator valve, in combination, a housing having inlet and outlet connections, a port providing communication between said connections, a diaphragm in said housing on the outlet side of said port, a hollow stem connected to said diaphragm and closing said port when gas pressure is minimized through said housing, an inner casing arranged in said housing and attached to the upper end of said hollow stem, a diaphragm secured in said casing, a stem attached at its upper end to said diaphragm in said casing and operating concentrically of said hollow stem, a closure for the lower end of said hollow stem adjustably arranged on said last named stem restricting said communication when said last named stem is raised by the diaphragm in said casing, and means for locking said hollow stem in its closed position until manually operated.

6. In an automatic gas cutoff and regulator valve, a housing having means for connecting the same in a gas conduit and inlet and outlet chambers defined therein, a communication between said chambers, a closure for said communication comprising a hollow stem having a seating surface about its lower end, a diaphragm in the outlet chamber connected to said hollow stem and amenable to gas pressure through said communication to raise said stem, an auxiliary casing in said housing above said diaphragm and connected thereto to be raised and lowered thereby, a second diaphragm in said auxiliary casing, a threaded stem attached to said second diaphragm in said auxiliary casing and operating concentrically of said hollow stem, adjustable means on said last named stem for closing said communication in said inlet chamber, and means locking said hollow stem in closed position when gas pressure is depleted in said outlet chamber.

References Cited in the file of this patent

UNITED STATES PATENTS

| Number | Name | Date |
|---|---|---|
| 942,042 | Petley | Nov. 30, 1909 |
| 1,946,882 | Russel | Feb. 13, 1934 |
| 2,156,823 | Stettner | May 2, 1939 |

FOREIGN PATENTS

| | | |
|---|---|---|
| 742,399 | France | Dec. 27, 1932 |
| 789,017 | France | Aug. 5, 1935 |